INVENTORS.
Oscar E. Seiferth,
Glenn M. Austin,
Harold E. Snyder,
BY Cromwell, Greist & Warden
Attys

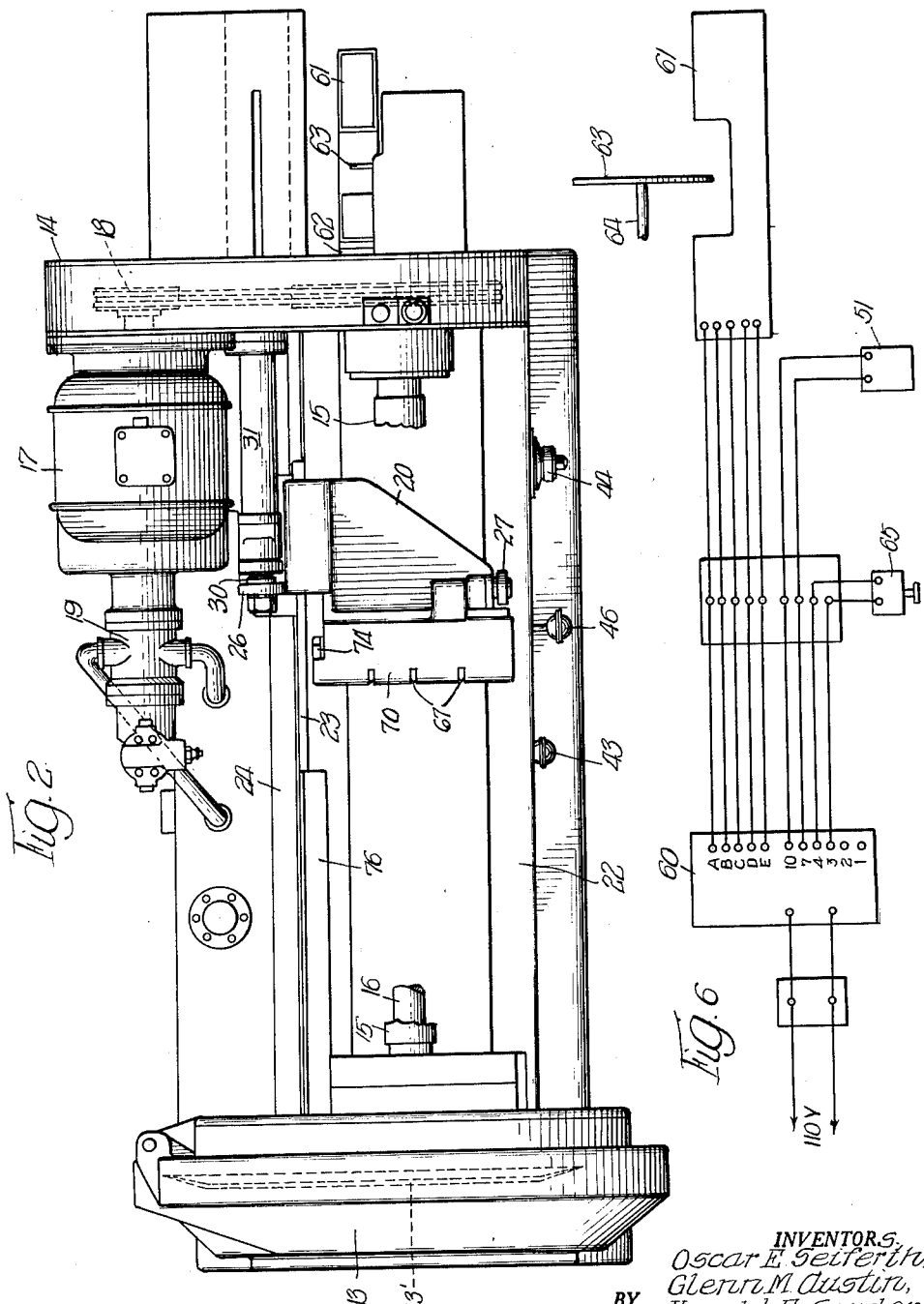

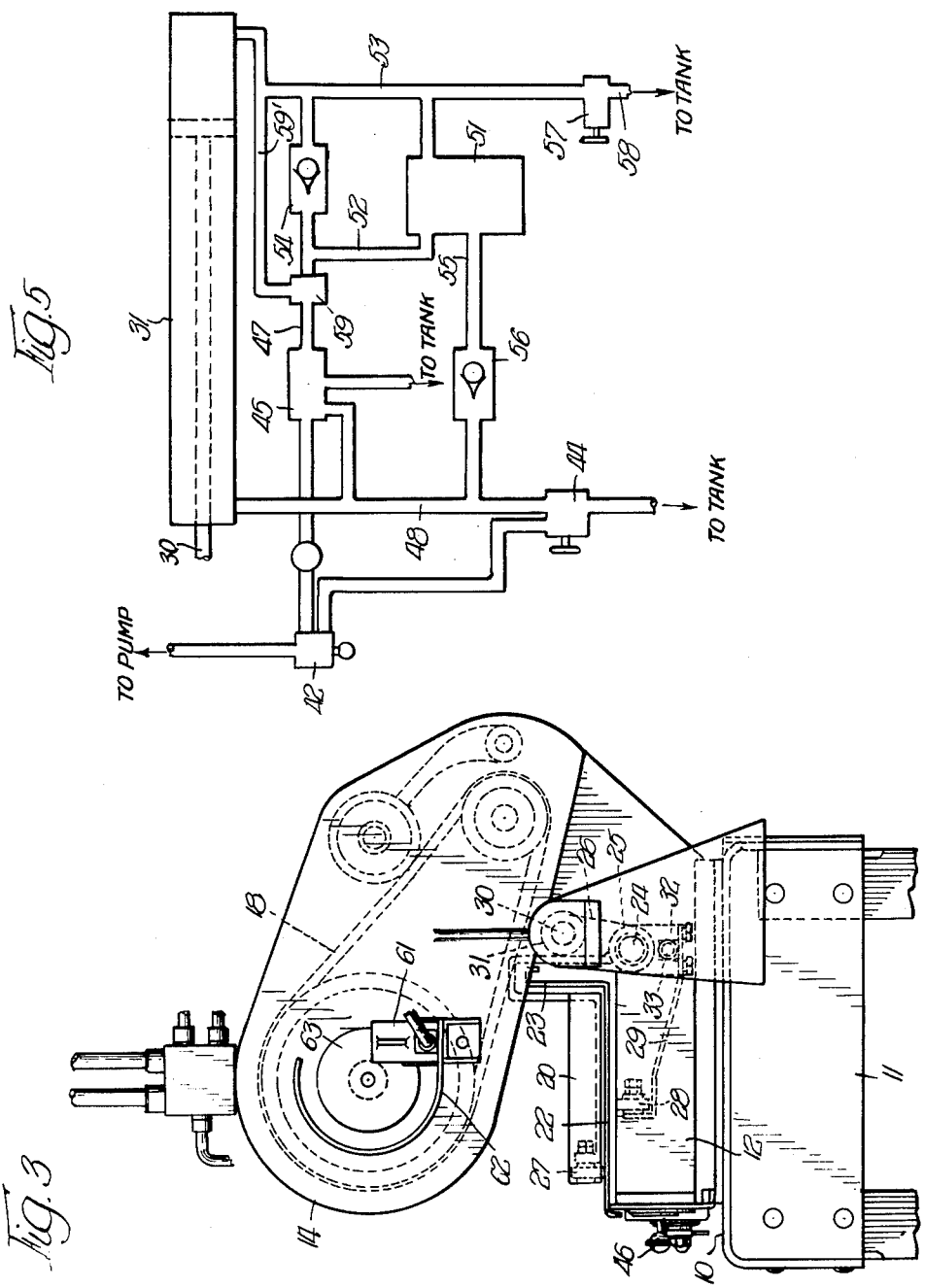

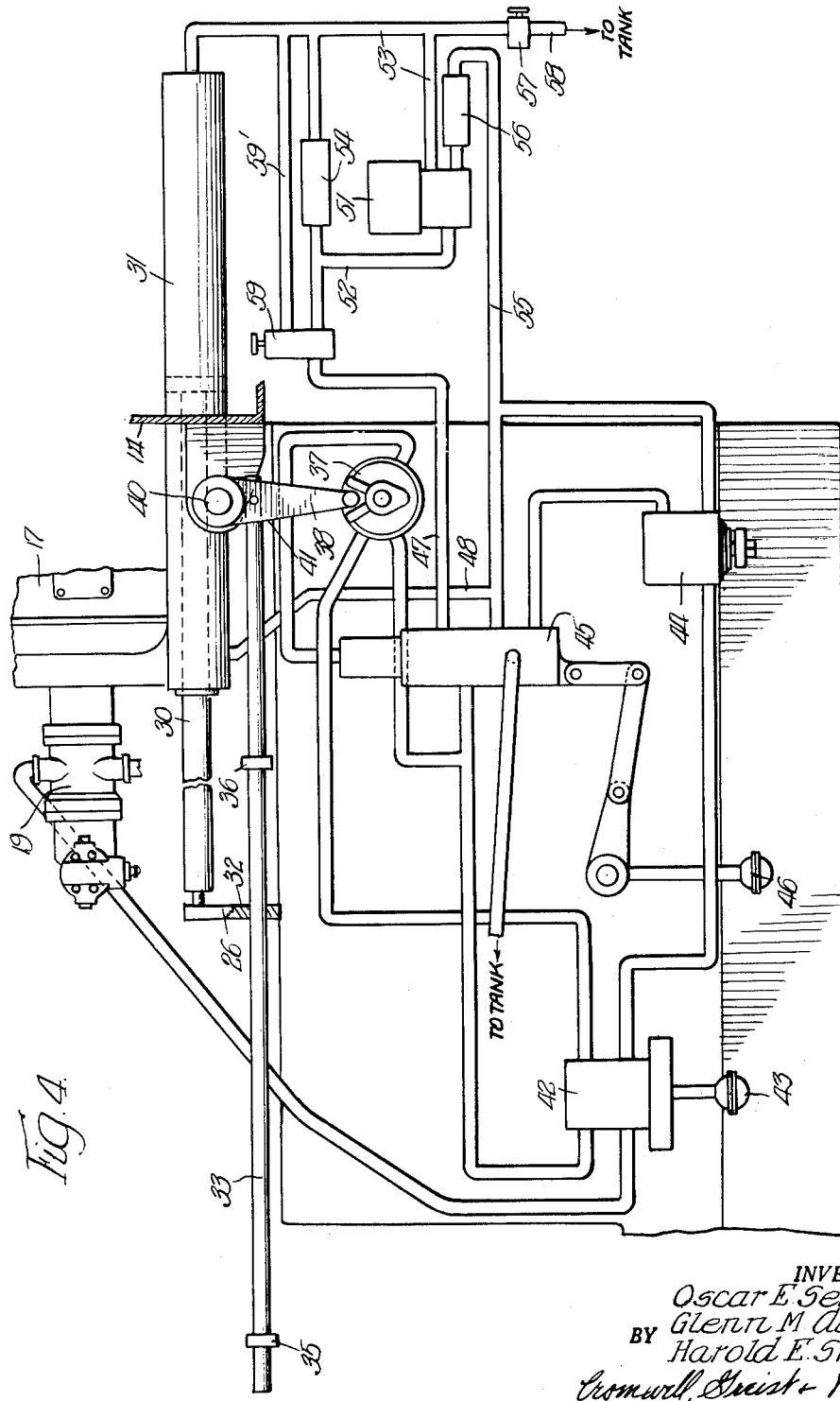

United States Patent Office 3,140,737
Patented July 14, 1964

3,140,737
SLICER FEED CONTROL APPARATUS
Oscar E. Seiferth, Glenn M. Austin, and Harold E. Snyder, Madison, Wis., assignors to Oscar Mayer & Co., Inc., Chicago, Ill., a corporation of Illinois
Filed Jan. 23, 1961, Ser. No. 84,139
8 Claims. (Cl. 146—94)

This invention relates to an apparatus for cutting slices of food products, such as meat or cheese, and is more particularly concerned with improvements in the controls for such apparatus.

Various machines are available commercially for slicing food products which are normally produced in slab or block form such as bacon and cheese which machines are operated to reduce the slab or block to a series of slices of predetermined thickness. Methods and apparatus have been devised for operating such machines to produce a predetermined number of slices in a group from the block product and to separate the groups as they come from the slicing machine. One common method has been to deliver the successive slices to a traveling conveyor, the speed of which is changed at intervals to achieve a separation between groups of slices. Because of the high speed at which the slicer operates controlling the speed of the take-away conveyor to achieve separation of groups of slices has not been satisfactory. Another procedure has been to stop the movement of the slab to the knife for an interval, but the apparatus which has heretofore been provided for this purpose has generally not been satisfactory because of the inability to stop the movement of the slab so as to avoid the production of partial slices or slivers at the beginning or end of the group. The present invention relates to apparatus of this type and a general object of the invention is to provide an apparatus for controlling the movement of the slab relative to the rotation of the slicing knife so that no partial cuts are made from the leading end of the slab either at the end of a group of slices or at the beginning of the next group of slices.

It is a more specific object of the invention to provide an apparatus for controlling the movement of the slab in a slicing machine so as to provide for slicing a group of a predetermined number of slices at intervals, for withdrawing the slab a predetermined distance at the completion of the last slice in a group, for holding the slab in a withdrawn position a sufficient length of time to separate the groups, and then allowing the slab to be advanced for the cutting of a whole slice as the first of the subsequent group.

These and other objects and advantages of the invention will be apparent from a consideration of the apparatus which is shown by way of illustration in the accompanying drawings wherein:

FIGURE 2 is a top plan view of the slicing machine;

FIGURE 3 is an end elevation view of the machine;

FIGURE 4 is a fragmentary view taken on the line 4—4 of FIGURE 1, to an enlarged scale, with parts broken away and with portions of the hydraulic system shown diagrammatically;

FIGURE 5 is a schematic layout of a portion of the hydraulic control apparatus; and FIGURE 6 is a schematic layout showing the electrical connections between the control valves for the hydraulic system and the slice counting apparatus.

Figure 1:
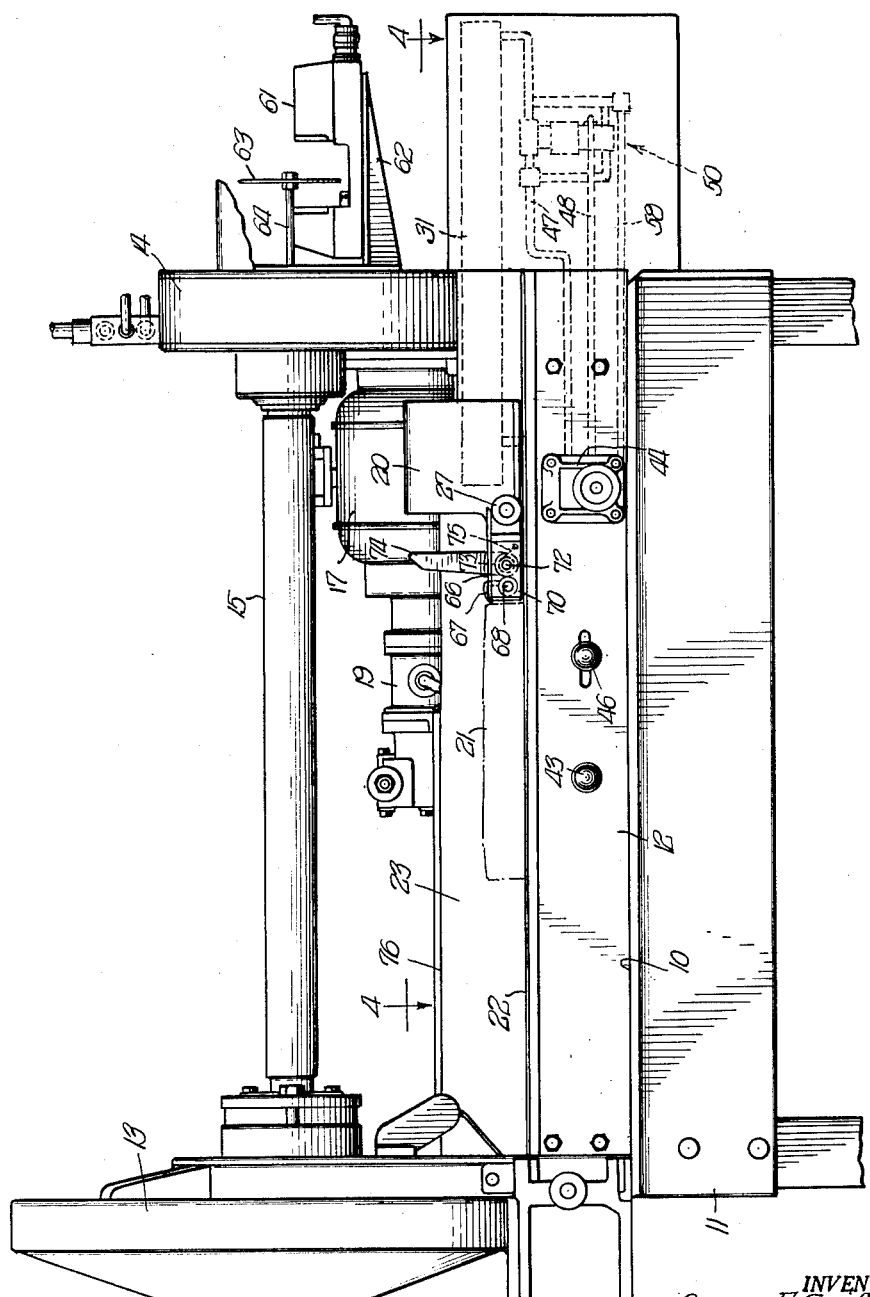
FIGURE 1 is a side elevation view of a slicing machine having embodied therein control apparatus illustrating the principles of the invention; the hydraulic system being shown in dotted outline.

The invention is illustrated in the drawings (FIGURES 1 to 3) as incorporated in a commercially available slicing machine which is produced by The Allbright Nell Co., Chicago, Illinois, and which is identified as "Anco No. 827-Hydromatic Bacon Slicer," the machine being designed especially for slicing bacon or similar products. The construction of this machine is well known and only those elements which are necessary for an understanding of the present invention will be referred to in detail.

The slicer is mounted on the table forming top 10 of an upright frame 11. It comprises a bed forming portion 12 having an upstanding knife housing 13 at one end and a drive housing 14 at the other end with a shaft housing 15 for a connecting drive shaft 16 extending between the two in spaced relation above the bed 12. The cutting or slicing knife 13' in FIGURE 2 is driven by a motor 17 having a belt and pulley connection, indicated at 18, with the knife shaft 16 which is suitably supported in the housing 15. The motor 17 also drives a pump 19 which forms part of the hydraulic system for operating the reciprocating feed carriage 20.

The slab of bacon 21 or other product to be sliced is supported on a guideway forming plate member having a horizontally disposed table forming portion 22 and a vertically disposed side flange portion 23, both of which extend longitudinally of the machine and form a supporting trackway for the feed carriage 20 and the product 21. The feed carriage 20 is guided in its feeding and return movements by a longitudinally extending guide rod or bar 24 secured between the housings 13 and 14 and extending through a bearing forming portion 25 of the vertically extending carriage bracket 26. The carriage 20 has a bearing roller 27 on its outer edge which rides on the top surface of the table 22 and a cooperating bearing roller 28 which is carried on an outwardly extending lower arm 29 and engages beneath the surface of the table 22. The vertical carriage bracket 26 is connected to the free end of an operating piston 30 (FIGURE 4) extending from an hydraulic cylinder 31 at the driven end of the machine. The carriage bracket 26 extends beneath the guide bar 24 and has a bifurcated portion 32 at its lower end which straddles a control rod 33. The control rod 33 extends longitudinally of the machine and is mounted for longitudinal sliding movement. It carries a pair of spaced stop collars 35 and 36 which may be adjusted so that they are engaged by the bifurcated portion 32 of the carriage bracket 28 and the rod 33 is shifted when the carriage reaches predetermined positions in its forward or feeding stroke and its return stroke. The direction of movement of the feed carriage 20 is controlled by a pivot valve 37 which has a horizontal operating arm or lever 38 pivotally mounted on the bearing bracket 40 and having a pivotal connection at 41 with the control rod 33 so that horizontal shifting movement of the control rod 33 operates the pivot valve 37 which in turn controls the flow of fluid to the driving cylinder 31 and determines the direction of movement of feed carriage 20.

The hydraulic system for moving the feed carriage 20 includes a two-way valve 42 (FIGURE 4) controlled by a hand lever 43 to start and stop the flow of hydraulic fluid from the pump 19 through the system, a flow control or throttle valve 44 which is adjustable to control the rate of flow, and a four-way valve 45 which is controlled by the pivot valve 37 and also by a hand lever 46, the latter being employed when rapid shifting of the feed carriage 20 is desired during either forward or rearward movement thereof. The lines interconnecting the valves 37, 42, 44, 45, the pump 19, the hydraulic cylinder 31 and a fluid supply tank (not shown) are indicated in FIGURE 4.

In the conventional arrangement of the hydraulic controls for the operation of the feed carraige 20, one discharge port of the four-way control valve 45 is connected by fluid line 47 with the one end of the cylinder 31 and the other discharge port of valve 45 is connected by fluid line 48 with the other end of the cylinder 31. Operation of the carriage 20, when started by opening valve 42, is then continuous and uninterrupted with the direction of movement under the control of the valve 45 and the reversing pivot valve 37. The rate or speed of movement, of course, can be varied by adjustment of the flow control valve 44 and some manual control of valve 45 by hand lever 46 is possible to speed up the movement of the carriage 20 when it is desired to move it forward rapidly at the start of the cycle of movement or when the carriage is retracted to receive a new slab or loaf of the product being cut or sliced.

In the present apparatus, control of the cylinder 31 is modified by an assembly of valves and electric controls therefor which is indicated at 50 in FIGURE 1, and shown diagrammatically in FIGURES 4 and 5. This assembly is connected into the line 47, which carries fluid to the rear end of cylinder 31, for moving the carriage 20 in the product feeding direction, at a point between the control valve 45 and the end of the cylinder 31. The control assembly 50 comprises a solenoid valve 51 which is operated by an electric impulse from a slice counter (not shown) and which has a fluid receiving port connected to the line 47 from the four-way control valve 45 through the line 52. A discharge port of the valve 51 is connected to the end of cylinder 31 through the line 53 so that when fluid flows through these ports and connecting lines to the cylinder 31, the carraige 20 advances in the direction of feed. A check valve 54 is connected between the line 53 and the line 52 to the control valve 45 which permits flow in the direction of the control valve 45 only. The other discharge port of the solenoid valve 51 is connected through the line 55 to the line 48 which carries fluid to the other end of the cylinder 31 for returning the carriage 20 to reloading position. A check valve 56 is placed in the line 55 which permits flow in the direction of the cylinder only. An adjustable bleeder control valve 57 connects the line 53 with the fluid supply tank (not shown) through the line 58. A by-pass valve 59 and line 59' permits a direct connection between the line 47 and the line 53 so that the control assembly 50 may be by-passed when it is not desired to use the same by operating valve 59.

The solenoid valve 51 is operated by electric impulses produced by an electronic counter which is indicated schematically at 60 in the electrical diagram of FIGURE 6 and which is not shown on the other views since it need not be placed on the machine. The counter 60 is a type which is available commercially, such as, the Potter Predetermined Counter No. 244 manufactured by Potter Instrument Company, Inc., Great Neck, New York. It is actuated by the interruption of a photoelectric light beam which in the present apparatus is produced by an electric eye device 61 (FIGURES 1 to 3) mounted by means of the horizontally disposed supporting bracket 62 on the drive housing 14. The beam is interrupted by means of a perforated disc 63 which is carried on a small shaft 64 secured on the end of the drive shaft 16 which operates the cutting blade. The disc 63 is secured on the end of the shaft 64 so that it may be rotated relative to the shaft 16 for timing adjustment when desired. The disc 63 is perforated so as to interrupt the beam once for each rotation of the knife shaft 16 and thus count the successive slices cut by the knife. The electric eye is connected to the counter 60 and the controls on the latter are set to produce an electric impulse when a predetermined number of slices have been counted and to hold the impulse for a period corresponding to a set number of slice counting intervals. The counter 60 is connected to the solenoid valve 51 so that each such impulse from the counter closes the normally open valve 51 and holds it closed for a predetermined period. As indicated in FIGURE 6, the slices are counted in the circuit indicated at A and when the number of slices for which the apparatus is set has been registered in the circuit A, the circuit B is actuated to produce the valve operating impulse and to hold the same during a count for which circuit B is set. Thereafter, the cycle of operations is repeated. The apparatus includes a trimmer button or switch indicated at 65 (FIGURE 6), which permits the user to interrupt the operation of the counter at any point and start a new counting sequence.

The carriage 20 (FIGURES 1 to 3) forms a pusher for advancing the product 21 to the cutting position beneath the slicing blade or knife. A product gripping device 66 is attached to the front of the carriage which comprises a set of product gripping fingers 67 mounted on a cross shaft 68 supported in the frame 70. The shaft 68 is connected for rotation by a cross shaft 72 by means of gears indicated at 73 and the operating shaft has a radially extending arm 74 at one end. The shaft 73 is provided with a clock spring indicated at 75 which urges the shaft 73 in a direction to hold the gripping fingers 67 in non-operative or retracted position, in which position the arm 74 extends in an upward direction. A cam bar 76 is mounted on the machine in the path of the arm 74 so that when the carriage 20 reaches a predetermined position in its forward movement, the arm 74 engages the end of the cam bar 76 and the shaft 73 is rotated to turn the gripping fingers 67 into gripping engagement with the trailing end of the product 21. When the carriage 20 is retracted, the unsliced end of the product is held by the fingers 67 so that it is withdrawn from the vicinity of the slicing knife and automatically released for removal when the gripper operating arm 74 moves out from beneath the cam bar 76.

In using the apparatus the carriage 20 is moved to the retracted position by manipulation of the hand levers 43 and 46 and a slab of the product 21 is placed in front of the carriage 20. The lever 43 is then swung to the "on" position to place the hydraulic system in operation, the lever 46 being moved to the neutral position. The carriage 20 then moves forward and when the leading end of the product reaches the slicing position, the operator presses the trimmer button 65 of the counter 60 to start the slice counting cycle. When the number of slices for which the counter 60 is set have been made by the knife the normally open solenoid valve 51 is closed to interrupt the flow of fluid through the line 53 to the cylinder 31 and stop the forward movement of the carriage 20 and also to impart a slight reverse movement to the carriage 20 due to the operation of the bleeder valve 57 which is adjusted to allow a small amount of fluid to escape from the line 53 to the fluid supply tank. When the valve 51 is closed by the impulse from the counter 60 the fluid received from lines 47, 52 and which is the open position of the valve passed through line 53 to the rear end of cylinder 31 is diverted through the line 55, check valve 56 and line 48, to the front end of the cylinder 31 and urges the piston 30 in the direction to stop the forward movement of the carriage 20 and reverse the movement slightly by exhausting fluid through line 53 and bleeder valve 57 back to the fluid supply tank. The valve 51 is opened by operation of the counter cutting off the current at the end of the count in circuit B and the carriage 20 resumes its forward movement. The interruption of the forward movement of the carriage and the slight reversee movement allows the slices to be delivered from the slicer to a conveyor traveling at uniform speed in successive spaced groups of a predetermined number of whole slices. The counter 60 is actuated in timed relation to the rotation of the cutting blade operating through the disc 63 and electric eye 61 with the disc 63 being adjustable to vary the timing as required. The production of chips at the beginning or end of the counting cycle can be eliminated by proper adjustment of the slice thickness, the timing of the counter and adjustment of the bleeder control valve 57 so as to provide the proper reverse movement of the carriage at the end of each group of slices. With a product of uniform cross section and density control of the slicing so as to provide groups of the same number of whole slices of the same size provides close control of the weight of each group.

While particular materials and specific details of construction have been referred to in describing the form of the apparatus illustrated, it will be understood that other materials and different details of construction may be resorted to within the spirit of the invention.

We claim:

1. In a meat slicing machine having a slicing blade mounted on a rotatable supporting shaft and a reciprocating carriage for feeding the meat to the blade, hydraulic means for moving the carriage comprising a double acting hydraulic cylinder having a reciprocating piston connected to said carriage and operating fluid lines connected at opposite ends of the cylinder, means for supplying a fluid under pressure to said lines, a valve normally controlling the direction of flow of the fluid to opposite ends of the cylinder and thereby controlling the direction of movement of said carriage, means operative in response to movements of the carriage to control said valve whereby to automatically reciprocate said carriage and an auxiliary control means comprising an electromagnetically operated valve in the line between said control valve and the one end of the cylinder, an electrical slice counting mechanism actuated by rotation of the blade supporting shaft and connected to said electromagnetic valve for operating said electromagnetic valve to stop the flow of fluid to said cylinder at intervals determined by the slice counting mechanism and thereby stop the forward movement of the carriage, and an adjustable bleeder valve in said line for causing a relatively slight reversal of the movement of the carriage when it is stopped in its forward movement by operation of said electromagnetic valve.

2. In a slicing machine having a slicing blade mounted on a rotatable supporting shaft and a reciprocating carriage for feeding a product to the blade, hydraulic means for moving the carriage comprising a hydraulic cylinder having a reciprocating piston connected to said carriage and fluid operating lines connected at opposite ends of the cylinder, means for supplying a fluid under pressure to said lines, a valve controlling the direction of flow of the fluid in the lines and thereby controlling the direction of movement of said carriage, means operative in response to movements of the carriage to operate said valve whereby to reciprocate said carriage and an auxiliary control means comprising an electrically operated valve in the line between said control valve and the one end of said cylinder, an electric slice counting mechanism actuated by rotation of the blade supporting shaft and connected to said valve for operating said valve to shut off the flow of fluid to said cylinder at intervals determined by the slice counting mechanism and thereby stop the carriage and a bleeder valve for relieving the pressure in said line so as to cause a relatively slight reversal of the movement of the feed carriage when it is stopped by operation of said electrically operated valve.

3. In a meat slicing machine having a slicing blade mounted on a rotatable supporting shaft and a reciprocating carriage for feeding the meat to the blade, hydraulic means for moving the carriage comprising a double acting hydraulic cylinder and lines connected at opposite ends thereof, means for supplying a fluid under pressure to said lines, a valve normally controlling the direction of flow of the fluid to opposite ends of the cylinder and thereby controlling the direction of movement of said carriage, means operative in response to movements of the carriage to control said valve whereby to normally reciprocate said carriage and an auxiliary control means comprising an electromagnetic valve in the line between said control valve and the one end of the carriage moving cylinder, an electronic slice counting mechanism actuated by rotation of the blade supporting shaft and connected to said electromagnetic valve for operating said electromagnetic valve to stop the flow of fluid to said cylinder at intervals determined by the slice counting mechanism and an adjustable bleeder valve in said line for causing a relatively slight reversal of the movement of the feed carriage when it is stopped in its forward movement by operation of said electromagnetic valve.

4. In a slicing machine having a slicing blade mounted on a rotatable supporting shaft and a reciprocating carriage for feeding the product to be sliced to the blade, hydraulic means for moving the carriage comprising a hydraulic cylinder having a reciprocating piston connected to said carriage and operating fluid lines connected to the cylinder for reciprocating the piston, means for supplying a fluid under pressure to said lines, a valve normally controlling the direction of flow of the fluid in the lines and thereby controlling the direction of movement of said carriage, means operative in response to movements of the carriage to control said valve whereby to automatically reciprocate said carriage and an auxiliary control means comprising a three-way valve in one of the lines between said control valve and the cylinder, a slice counting mechanism actuated in response to rotation of the blade supporting shaft and having a connection with said valve for operating said valve to stop the flow of fluid to said cylinder at intervals determined by the slice counting mechanism and thereby stop the forward movement of the carriage and a bleeder valve in one of said lines for relieving the pressure in said line so as to cause a relatively slight reversal of the movement of the carriage when it is stopped by operation of said control valve.

5. In a slicing machine having a slicing blade mounted on a rotatable supporting shaft and a reciprocating carriage for feeding a product to the blade, hydraulic means for moving the carriage comprising a hydraulic cylinder having a reciprocating piston connected to said carriage and fluid operating lines connected at opposite ends of the cylinder, means for supplying a fluid under pressure to said lines, a valve controlling the direction of flow of the fluid in the lines and thereby controlling the direction of movement of said carriage, means operative in response to movements of the carriage to operate said valve whereby to automatically reciprocate said carriage and an auxiliary control apparatus comprising an electrically operated valve in the line between said control valve and the one end of said cylinder, an electrically actuated slice counting mechanism, means actuated by rotation of the blade for operating the slice counting mechanism, means connected to said slice counting mechanism and said valve for operating said valve to shut off the flow of fluid to said cylinder after a predetermined number of slices are cut and thereby stop the carriage and a bleeder valve for relieving the pressure in said line so as to cause a relatively slight reversal of the movement of the feed carriage when it is stopped by said electrically operated valve.

6. In a slicing machine having a slicing blade mounted on a rotatable supporting shaft and a reciprocating carriage for feeding a product to the blade, hydraulic means for moving the carriage comprising a double acting hydraulic cylinder having a piston connected to said carriage and lines connected on opposite sides of the piston, means for supplying an operating fluid under pressure to said lines, a control valve in said lines normally controlling the direction of flow of the fluid to opposite sides of the piston so as to control the direction of movement of said carriage, a pivot valve for operating said control valve, means for operating said pivot valve which is responsive to movements of said carriage and an auxiliary control means comprising an electrically operated valve in the line between said control valve and the one side of said piston, a slice counting mechanism actuated by an electric eye, means operated by rotation of the blade supporting shaft to interrupt the light beam of said electric eye for each rotation of said blade supporting shaft, said electrically operated valve, said slice counting mechanism and said electric eye being connected so as to operate said valve to stop the flow of fluid after a predetermined number of slices are cut, means in said line for causing a relatively slight reversal of the movement of the feed carriage when it is stopped in its forward movement by operation of said electrically operated valve.

7. In a slicing machine having a slicing blade mounted on a rotatable supporting shaft and a reciprocating carriage for feeding a product to the blade, hydraulic means for moving the carriage comprising a double acting hydraulic cylinder and lines connected thereto at opposite sides of the piston, means for supplying a fluid under pressure to said lines, a valve normally controlling the direction of flow of the fluid to the cylinder and thereby controlling the direction of movement of said carriage, means operative in response to movements of the carriage to control said valve whereby to normally reciprocate said carriage and an auxiliary control means comprising a three-way valve in one of the lines between said control valve and the carriage moving cylinder, a slice counting mechanism, means for operating said slice counting mechanism in accordance with the rotation of the blade supporting shaft, and means connecting the slice counting mechanism with said three-way valve to stop the flow of fluid to said cylinder at intervals determined by the slice counting mechanism and an adjustable bleeder valve connected to said carriage moving cylinder for causing a relatively slight reversal of the movement of the feed carriage when it is stopped in its forward movement by operation of said three-way valve.

8. In a slicing machine having a slicing blade mounted on a rotatable supporting shaft and a reciprocating carriage for feeding the product to be sliced to the blade, hydraulic means for moving the carriage comprising a hydraulic cylinder having a reciprocating piston connected to said carriage and operating fluid lines connected to the cylinder for reciprocating the piston, means for supplying a fluid under pressure to said lines, a valve normally controlling the direction of flow of the fluid in the lines and thereby controlling the direction of movement of said carriage, means operative in response to movements of the carriage to control said valve whereby to automatically reciprocate said carriage and an auxiliary control means comprising an auxiliary control valve in one of the lines between said flow control valve and the cylinder, a slice counting mechanism actuated in response to rotation of the blade supporting shaft and having a connection with said auxiliary control valve for operating said flow control valve to stop the flow of fluid to said cylinder at intervals determined by the slice counting mechanism and thereby stop the forward movement of the carriage, and means in said lines for causing a relatively slight reversal of the movement of the feed carriage when it is stopped in its forward movement by operation of said auxiliary control valve.

References Cited in the file of this patent
UNITED STATES PATENTS

| | | |
|---|---|---|
| 2,768,666 | Garapolo et al. | Oct. 1, 1956 |
| 2,812,792 | Allbright | Nov. 12, 1957 |
| 2,832,388 | Folk | Apr. 29, 1958 |
| 2,898,962 | Burnett | Aug. 11, 1959 |
| 2,903,032 | Cervene | Sept. 8, 1959 |
| 2,922,280 | Rehlander | Jan. 26, 1960 |
| 2,966,186 | Garapolo | Dec. 27, 1960 |
| 2,969,099 | Gillman | Jan. 24, 1961 |
| 3,010,499 | Dahms | Nov. 28, 1961 |
| 3,015,350 | Reichel et al. | Jan. 2, 1962 |